(12) United States Patent
Wyer et al.

(10) Patent No.: US 10,536,772 B2
(45) Date of Patent: Jan. 14, 2020

(54) AUDIO SYSTEM

(71) Applicant: Chill Gaming Pty Ltd, Southbank, Vic (AU)

(72) Inventors: Andrew Wyer, Glen Iris (AU); Peter James Herring, Box Hill South (AU); Daryl Bridges, Selby (AU); Joseph Ronald Crepaldi, Potts Point (AU); Norman R. Wurz, Elmhurst, IL (US); Robert A. Wand, Elgin, IL (US); Bruce Weisberg, Westlake Village, CA (US); Richard M. Walborn, Anaheim, CA (US)

(*) Notice: Subject to any disclaimer, the term of this patent is extended or adjusted under 35 U.S.C. 154(b) by 0 days.

(21) Appl. No.: 15/625,843

(22) Filed: Jun. 16, 2017

(65) Prior Publication Data

US 2018/0310095 A1   Oct. 25, 2018

Related U.S. Application Data

(60) Provisional application No. 62/506,220, filed on May 15, 2017, provisional application No. 62/487,448, filed on Apr. 19, 2017.

(51) Int. Cl.
*H04R 1/32* (2006.01)
*A63F 13/26* (2014.01)
(Continued)

(52) U.S. Cl.
CPC ............. *H04R 1/323* (2013.01); *A63F 13/26* (2014.09); *A63F 13/92* (2014.09); *H04R 1/028* (2013.01); *H04R 2499/15* (2013.01)

(58) Field of Classification Search
CPC ........ H04R 1/025; H04R 1/028; H04R 1/323; H04R 1/345; H04R 1/403; H04R 5/02;
(Continued)

(56) References Cited

U.S. PATENT DOCUMENTS

| 3,557,324 A | * | 1/1971 | Yoshiro | ................ H04N 5/642 348/738 |
| 4,214,298 A | | 7/1980 | Propst et al. | |

(Continued)

FOREIGN PATENT DOCUMENTS

| EP | 1041538 | 12/2006 |
| WO | WO 2013/184860 | 12/2013 |

OTHER PUBLICATIONS

International Search Report and Written Opinion in International Application No. PCT/AU2017/050795, Notification dated Oct. 10, 2017.

*Primary Examiner* — Joshua Kaufman
(74) *Attorney, Agent, or Firm* — Knobbe Martens Olson & Bear LLP

(57) ABSTRACT

Described embodiments generally relate to an audio system comprising at least one display device configured to display images; at least two speakers configured to generate audio output; housing structure configured to accommodate the at least one display device and the at least one speaker, the housing structure defining at least one sound delivery aperture extending at least partially along at least two sides of a perimeter of the at least one display device; and a waveguide defined within the housing structure and configured to guide the audio output generated by the at least one speaker through the at least one sound delivery aperture.

14 Claims, 14 Drawing Sheets

(51) Int. Cl.
*A63F 13/92* (2014.01)
*H04R 1/02* (2006.01)

(58) Field of Classification Search
CPC .............. H04R 5/023; H04R 2205/024; H04R 2499/15; H04N 5/642; A63F 13/26; A63F 13/92
See application file for complete search history.

(56) References Cited

U.S. PATENT DOCUMENTS

| | | | | |
|---|---|---|---|---|
| 4,998,283 | A * | 3/1991 | Nishida | G03B 21/565 181/161 |
| 5,119,429 | A * | 6/1992 | Chatelain | H04N 5/642 348/E5.13 |
| 5,274,709 | A * | 12/1993 | Koizumi | H04N 5/642 181/145 |
| 5,452,025 | A * | 9/1995 | Koizumi | H04N 5/642 348/805 |
| 5,524,062 | A * | 6/1996 | Oh | H04R 1/2842 181/156 |
| 5,710,394 | A * | 1/1998 | Saito | H04R 5/02 181/152 |
| 5,821,471 | A * | 10/1998 | McCuller | H04M 1/035 181/156 |
| 5,898,137 | A * | 4/1999 | Saito | H04N 5/642 181/144 |
| 6,035,051 | A * | 3/2000 | Sato | H04R 5/02 181/152 |
| 6,298,942 | B1 * | 10/2001 | Schlatmann | H04N 5/642 181/141 |
| 6,324,052 | B1 * | 11/2001 | Azima | G06F 1/1616 361/679.23 |
| 6,335,974 | B1 * | 1/2002 | Kunimoto | H04R 5/02 181/182 |
| 7,471,804 | B2 * | 12/2008 | Lee | H04N 5/642 312/7.2 |
| 8,282,489 | B2 | 10/2012 | Arezina et al. | |
| 2003/0235320 | A1 * | 12/2003 | Hirschhorn | F16M 11/041 381/333 |
| 2004/0053699 | A1 * | 3/2004 | Rasmussen | G07F 17/32 463/46 |
| 2005/0047617 | A1 * | 3/2005 | Lee | H04N 5/642 381/306 |
| 2006/0093133 | A1 * | 5/2006 | Park | H04M 1/0235 379/433.12 |
| 2007/0223763 | A1 * | 9/2007 | Bienek | H04N 5/642 381/337 |
| 2007/0259713 | A1 | 11/2007 | Fiden et al. | |
| 2007/0274547 | A1 * | 11/2007 | Ueno | H04N 5/642 381/306 |
| 2009/0034759 | A1 * | 2/2009 | Ko | H04N 5/642 381/152 |
| 2009/0270168 | A1 | 10/2009 | Englman et al. | |
| 2011/0212766 | A1 | 9/2011 | Bowers et al. | |
| 2011/0244935 | A1 | 10/2011 | Matthews et al. | |
| 2012/0115593 | A1 | 5/2012 | Vann et al. | |
| 2012/0115594 | A1 | 5/2012 | Hornik et al. | |
| 2012/0322564 | A1 * | 12/2012 | Granger | A63F 13/08 463/46 |
| 2013/0016864 | A1 | 1/2013 | Ivey et al. | |
| 2014/0093114 | A1 * | 4/2014 | Nguyen | H04R 1/02 381/361 |
| 2014/0269207 | A1 * | 9/2014 | Baym | G10K 11/26 367/138 |
| 2014/0269214 | A1 * | 9/2014 | Baym | H04R 3/00 367/197 |
| 2014/0328491 | A1 * | 11/2014 | Slotte | H04R 1/2811 381/74 |
| 2014/0378195 | A1 | 12/2014 | Lee et al. | |
| 2017/0333785 | A1 | 11/2017 | Herring et al. | |
| 2017/0333793 | A1 | 11/2017 | Herring et al. | |
| 2017/0337776 | A1 | 11/2017 | Herring et al. | |
| 2018/0160219 | A1 * | 6/2018 | Englert | G06F 1/1605 |

* cited by examiner

AUDIO SYSTEM

CROSS-REFERENCE TO RELATED APPLICATIONS

The present application claims priority under 35 U.S.C. § 119(e) to U.S. Provisional Patent Application No. 62/487,448, entitled "AUDIO SYSTEM" and filed on Apr. 19, 2017, and to U.S. Provisional Patent Application No. 62/506,220, entitled "AUDIO SYSTEM" and filed on May 15, 2017, the entire contents of both of which are hereby incorporated herein by reference.

TECHNICAL FIELD

Described embodiments generally relate to an audio system. In particular, described embodiments relate to an audio system integrated with a display device.

BACKGROUND

Display devices such as televisions, computer monitors and gaming machines often have associated audio systems configured to deliver audio to a user to complement the images the user is being presented on the display device. For example, one or more speakers may be used to deliver the audio output to the user. In some cases, it is desirable to have the sound reach the user from multiple directions to give the user a better quality experience. Right and left speakers may be used, for example, positioned on either side of a user, so that the user experiences the sound from both directions. In cinemas and home theatres, surround sound systems may be used to deliver audio content from a plurality of directions, enabling particular sound effects to sound like they are coming from a particular direction with respect to the user. However, for certain arrangements, such as for gaming machines, having multiple speakers becomes logistically difficult due to the small space available, as there may not be enough space in or around the gaming machine to properly position the speakers.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

Some embodiments relate to an audio system comprising:
at least one display device configured to display images;
at least two speakers configured to generate audio output;
housing structure configured to accommodate the at least one display device and the at least one speaker, the housing structure defining at least one sound delivery aperture extending at least partially along at least two sides of a perimeter of the at least one display device;
a waveguide defined within the housing structure and configured to guide the audio output generated by the at least one speaker through the at least one sound delivery aperture.

The at least one aperture may substantially surround the perimeter of the at least one display device. The audio system may comprise at least four speakers.

The speakers may be installed in the waveguide. The waveguide may divide the space inside the housing structure into at least one internal plenum and at least one external plenum. The speakers may generate audio output in response to receiving digital signals from an amplifier. The amplifier may be in communication with a digital signal processor (DSP) configured to mix and equalise the generated audio.

The audio system may further comprise at least one lighting element in the housing. The at least one lighting element may be configured to direct light through the at least one sound delivery aperture. The at least one lighting element may be configured to direct light through the at least one sound delivery aperture by directing light onto an internal surface of the housing to reflect from the internal surface through the at least one sound delivery aperture.

The at least two speakers may not be visible from outside the housing. The at least one lighting element may not be visible from outside the housing.

The at least one display device may comprise a first display device and the audio system may further comprise a second display device housed by the housing structure and associated with a second set of internal speakers and a second waveguide similar to the first display device, with the first and second display devices.

The at least one display device may comprise at least one of a television, a computer monitor, a gaming machine, a tablet, a mobile phone, and a handheld gaming device.

Some embodiments relate to a gaming machine comprising at least one audio system as described above. Some embodiments relate to a gaming machine comprising at least two audio systems as described above. The gaming machine may further comprise a sub-woofer.

Some embodiments relate to methods of calibrating, configuring and/or optimising audio output for audio systems described herein. Some embodiments relate to methods of outputting audio from around peripheral edge portions of a display as described herein.

BRIEF DESCRIPTION OF DRAWINGS

Embodiments are described below in further detail and by way of example, with reference to the accompanying drawing, in which.

DESCRIPTION OF EMBODIMENTS

Described embodiments generally relate to an audio system. In particular, described embodiments relate to an audio system integrated with a display device.

Televisions, computer monitors and gaming machines are all display devices that are commonly used with an associated audio system to deliver audio to a user to complement the images the user is being presented on the display device. Embodiments relate to a display device having an integrated audio system to deliver audio to a user. Described embodiments may be applied to display devices including televisions, computer monitors, gaming machines, and handheld display devices such as tablets, mobile phones and handheld gaming devices.

Some described embodiments relate to a display device with an integrated audio system having no visible speakers, using waveguide technology and narrow exit slots to produce a premium audio experience to the user, and optionally having a built in LED-based aesthetic lighting component. The display device may combine video, enhanced audio and effect-based lighting to produce an enhanced experience for the consumer.

Figure 1:
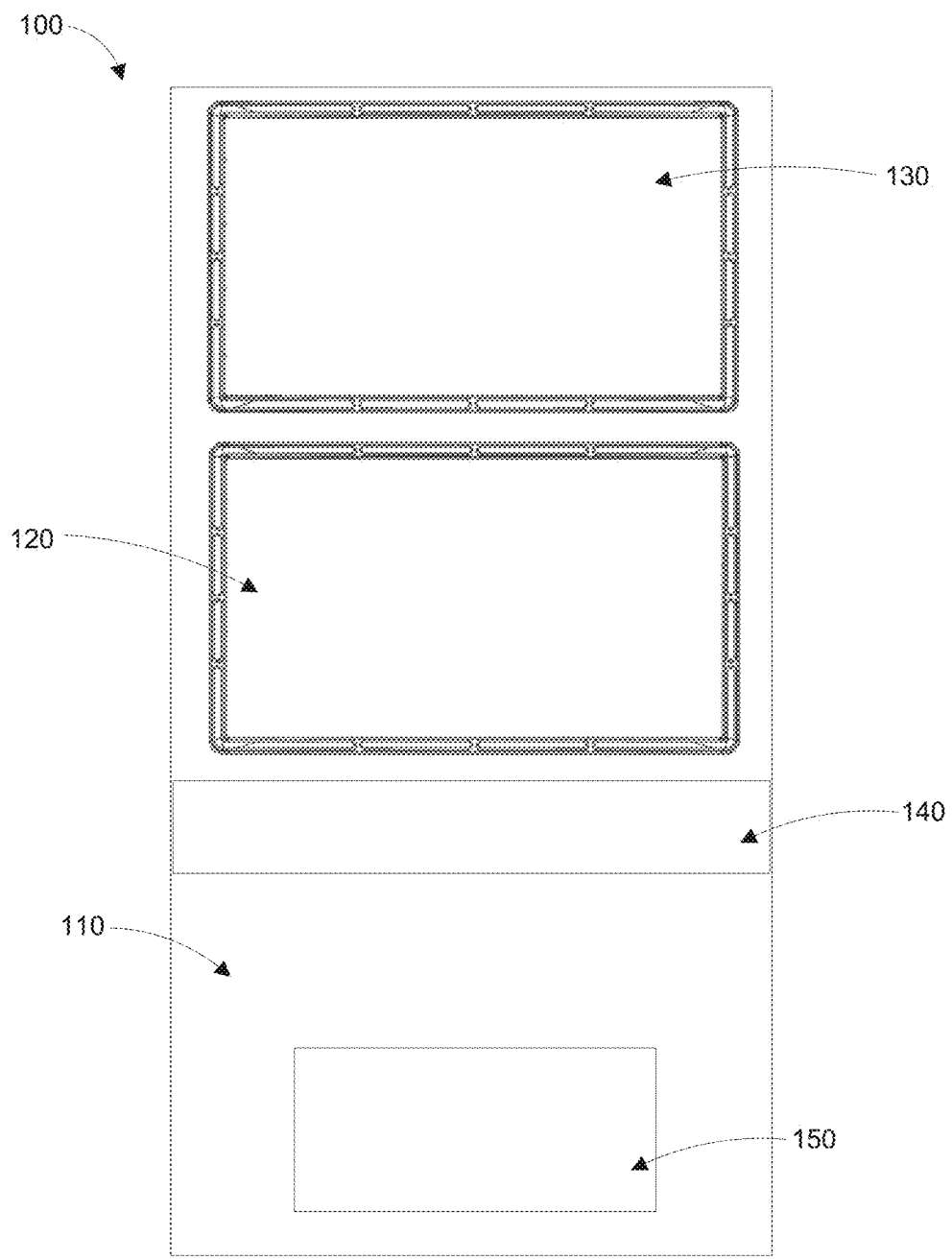
FIG. 1 is a diagram showing a gaming machine comprising an audio system according to some embodiments.

FIG. 1 shows a gaming machine 100 incorporating an audio system according to some embodiments. While the illustrated embodiments all feature gaming machine 100, it is to be understood that the same physical arrangement of the audio system should be applied to another display device, such as a television, computer monitor, handheld display device, tablet, mobile phone or handheld gaming device. Gaming machine 100 has game housing structure (referred to for convenience as a housing 110), a primary display 120 and a secondary display 130. Housing 110 is configured to support primary and secondary displays 120 and 130, as well as a user input panel 140 and a sub-woofer 150. According to some embodiments, housing 110 may further support one or more additional displays and speakers. According to some embodiments, gaming machine 100 may comprise only a single display, such as primary display 120, for example.

According to some embodiments, at least one of primary display 120 and secondary display 130 may comprise an audio system. For the purposes of this document, an audio system incorporated within primary display 120 will be described in detail. However, a skilled person will understand that secondary display 130 or other display devices may incorporate one or more features of the described audio system.

User input panel 140 may comprise one or more user input devices to allow a user to communicate with gaming machine 100 and, according to some embodiments, play a game presented by gaming machine 100. The input devices may include buttons, joysticks, keyboards, switches, touch screens, and other input devices. According to some embodiments, user input panel 140 may also comprise one or more output devices, such as a screen, printer, LEDs, or other output device, to communicate information to the user.

Sub-woofer 150 may comprise a speaker configured to deliver low-frequency audio. Sub-woofer 150 may be configured to deliver audio output to correspond with (and complement) audio and visual output delivered through one or more of primary and secondary displays 120 and 130, and any other displays or speakers associated with gaming machine 100. According to some embodiments, the sub-woofer may be around 4"×6" in size, and may be of an elliptical, circular, rectangular or square shape. According to some embodiments, the sub-woofer enclosure may be around 9.5"×9.5"×7.5" in size, and may be installed with a ported box alignment. According to some embodiments, sub-woofer 150 may comprise two or more sub-woofers. According to some embodiments, sub-woofer 150 is positioned entirely within a cabinet in the lower half of gaming machine 100.

FIGS. 2 to 8 show primary display 120 in further detail. Primary display 120 comprises a front panel 121, a display screen 124, sound guide 125, speaker mount 127 and a back panel 129. Together, front panel 121 and back panel 129 make up display housing structure (referred to for convenience as a housing) configured to contain display screen 124, sound guide 125, and speaker mount 127. According to some embodiments, front panel 121 defines a viewing window 122, which may be an aperture or a transparent section through which display screen 124 may be viewed. Where primary display 120 is a television, computer monitor, or handheld device, the housing and sound guide may be of a smaller and flatter size and shape than illustrated.

Front panel 121 and back panel 129 may be of a generally rectangular or square shape. According to some embodiments, front panel 121 and back panel 129 may be formed as a single unitary housing. In some embodiments front panel 121 and/or back panel 129 may be formed of multiple individual panels or housing components. Front panel 121 may be removably attached to back panel 129 via an attachment arrangement which may comprise screws, screw holes, complementary apertures and protrusions, latches, clasps, or other attachment components.

Figure 2:
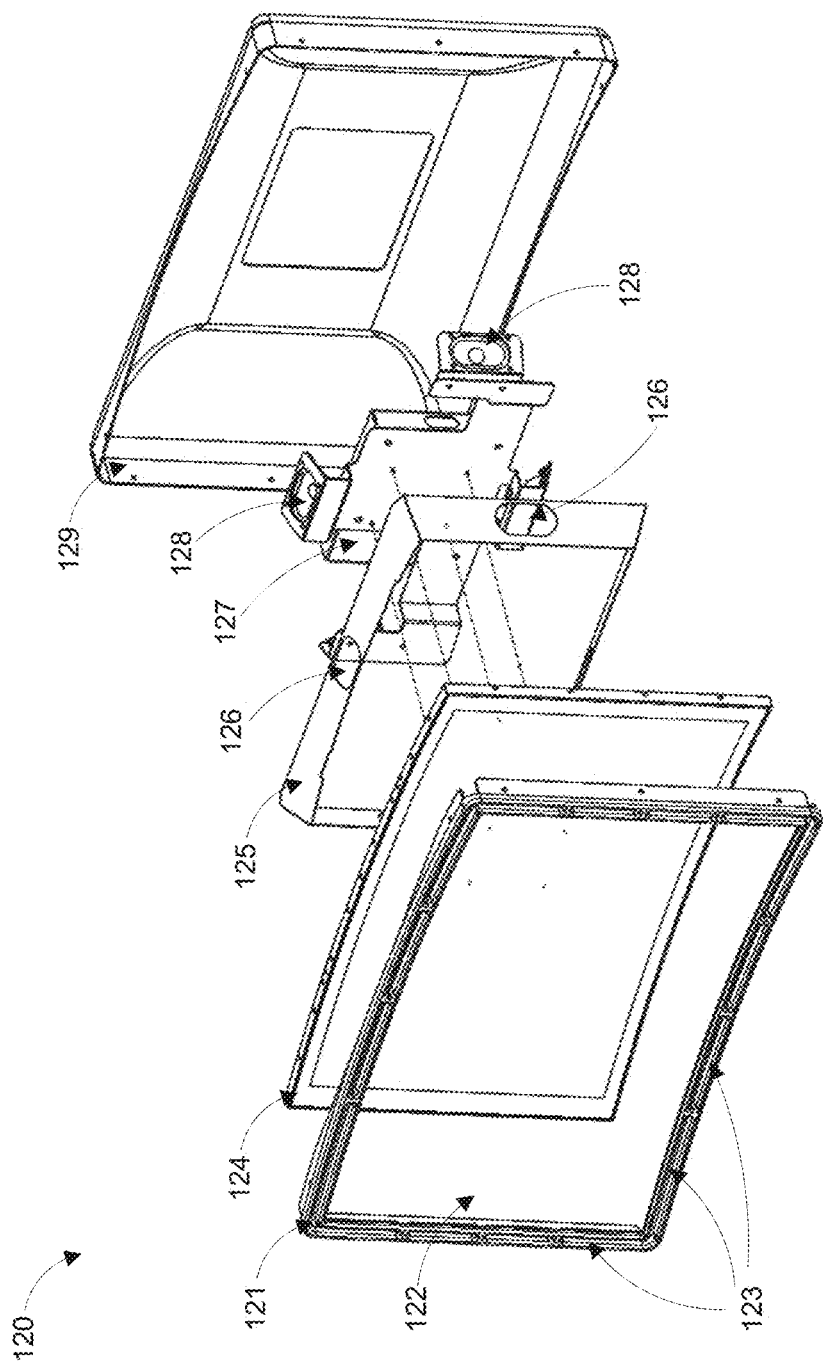
FIG. 2 is an exploded front perspective view of a display device comprising an audio system in accordance with some embodiments.
Figure 3:
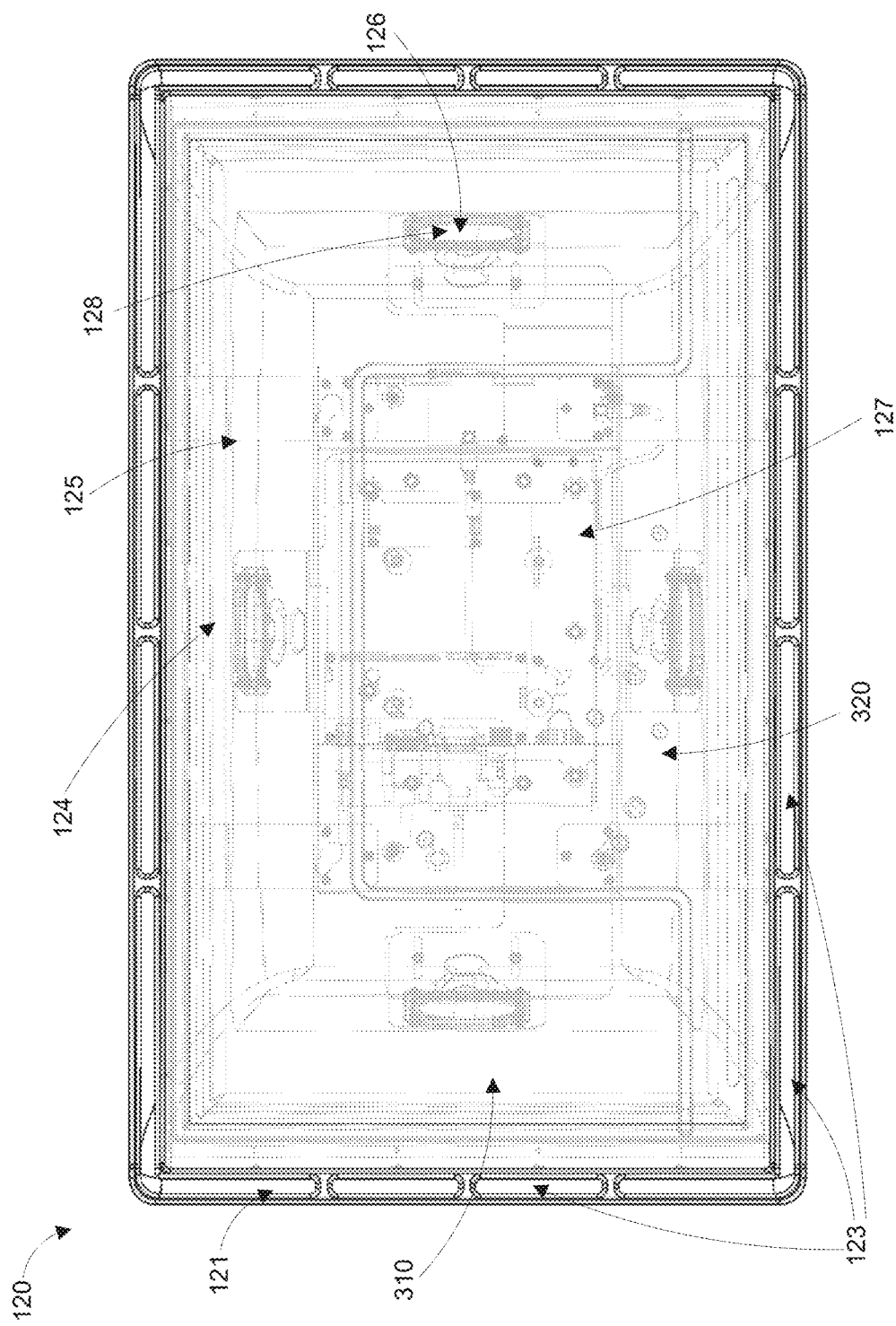
FIG. 3 is a front view of the display device of FIG. 1.

Front panel 121 defines at least one sound delivery aperture 123. According to some embodiments, the at least one sound delivery aperture 123 at least partially surrounds the outer edge of viewing window 122, and is configured to allow sound to be delivered from primary display 120 to a user that is positioned to view display screen 124. According to some embodiments, front panel 121 defines a plurality of sound delivery apertures 123 at least partially surrounding viewing window 122, as shown in FIGS. 2 and 3. According to some embodiments, the plurality of sound delivery apertures 123 may be positioned proximate at least two sides of a perimeter of display screen 124, and may extend along or partially along at least two sides of a perimeter of display screen 124. For example, front panel 121 may define top, bottom, left and/or right sound delivery apertures 123.

According to some embodiments, sound delivery aperture 123 may extend continuously around one or more corners. According to some embodiments, front panel 121 may define a single continuous sound delivery aperture 123 that surrounds or partially surrounds viewing window 122. According to some embodiments, sound delivery aperture 123 may be form a rectangular shape surrounding or partially surrounding viewing window 122. Sound delivery aperture 123 may extend to be proximate to at least two sides of a perimeter of display screen 123, such as the top and bottom sides, left and right sides, or the top, left and right sides, for example.

Apertures 123 may be between around 5 mm and 15 mm in width in some embodiments, and may be between around 6 mm and 12 mm in width according to some embodiments. According to some embodiments, apertures 123 may be between 10 and 12 mm wide. According to some embodiments, apertures 123 may be between around 5 mm and 15 mm in depth, and may be between around 6 mm and 12 mm in depth according to some embodiments. Apertures 123 may be narrow and slot-like in shape, with a bezel edge, and may extend just outside the edge of front panel 121. According to some embodiments, apertures may curve inwardly as they extend backward into front panel 121. According to some embodiments, the apertures may be flat slots with no substantial internal curvature. According to some embodiments, front panel 121 may comprise one or more bridging portions extending across the width of one or more apertures 123, in order to provide structural support to front panel 121. According to some embodiments, sound apertures 123 together with external plenum 320 may define one or more sound transition passages extending from speakers 128.

Front panel 121 may be shaped to encase display screen 124. Display screen 124 may comprise an LED, LCD, cathode ray, or other display screen configured to present images to a user. The images may be part of a video stream according to some embodiments, and may comprise game graphics, television, movies, advertisements, or other content. While the illustrations show primary display 120 having a single display screen 124, according to some embodiments, primary display 120 may comprise two, three, four, five, six, or more display screens, sub-screens or screen sections in some embodiments.

Display screen 124 is a substantially flat display in some embodiments. In some embodiments, such as those illustrated in FIGS. 2 to 8, display screen 124 is concavely curved. In some alternative embodiments, display screen 124 may be convexly curved. Display screen 124 may be around 24" or around 32" along the diagonal in some embodiments. Display screen 124 may be of a generally square or generally rectangular shape in some embodiments. According to some embodiments, display screen 124 may be mounted and configured to be viewed in a horizontal orientation, with the longest axis being along the viewer's horizon (i.e. a landscape view rather than a portrait view). According to some embodiments, display screen 124 may be mounted and configured to be viewed in a vertical orientation (i.e. a portrait view).

Figure 4:
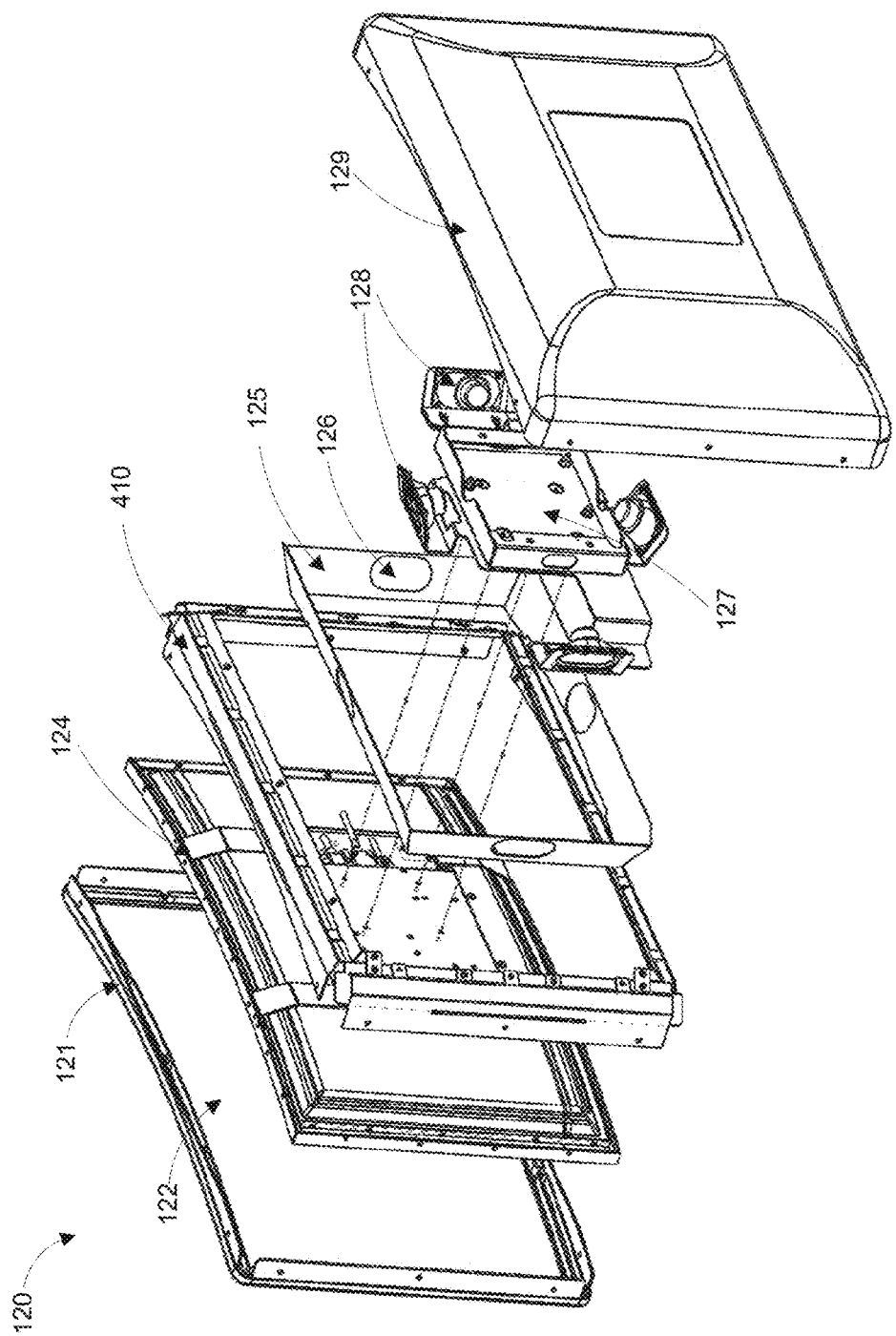
FIG. 4 is an exploded back perspective view of the display device of FIG. 1.

According to some embodiments, display screen 124 may be mounted on a display screen frame 410, as shown in FIG. 4, which may act as an enclosure for the display.

According to some embodiments, speaker mount 127 and sound guide 125 are mounted behind display screen 124, so that speaker mount 127 and sound guide 125 are obscured by display screen 124 to a person that is viewing display screen 124 from the front.

Speaker mount 127 may be configured to support one or more speakers 128. According to some embodiments, speaker mount 127 may support just one speaker 128. According to some alternative embodiments, speaker mount 127 may be configured to support two or more speakers 128 to produce a stereo effect, and to allow for movement effects to be created with the sound, such as by causing an effect whereby the source of the sound appears to move. Speakers 128 may be satellite speakers in some embodiments. According to some embodiments, speakers 128 may include high frequency satellite drivers, and may be around 2"×3" in size. Speakers 128 may be elliptical, circular, rectangular or square according to some embodiments. While the illustrated embodiments show four speakers 128, some embodiments may contain only one, two or three speakers 128. Some embodiments may contain five, six, seven, eight, nine, ten, or more speakers 128. According to some embodiments, where multiple display screens such as primary display 120 are designed to be positioned proximally to one another, each display may be configured so that one or more speakers are omitted or so that there is only a single speaker 128 in the region where the housings for the two adjacent displays abut. For example, in the illustrated embodiment having a primary display 120 and a secondary display 130, primary display 120 may have four speakers positioned in the upper, lower, right and left areas of the screen as shown, while secondary display 130 may comprise only three speakers 128, being a right, left, and a lower speaker. In other words, the upper speaker is omitted from secondary display 130.

Figure 5:
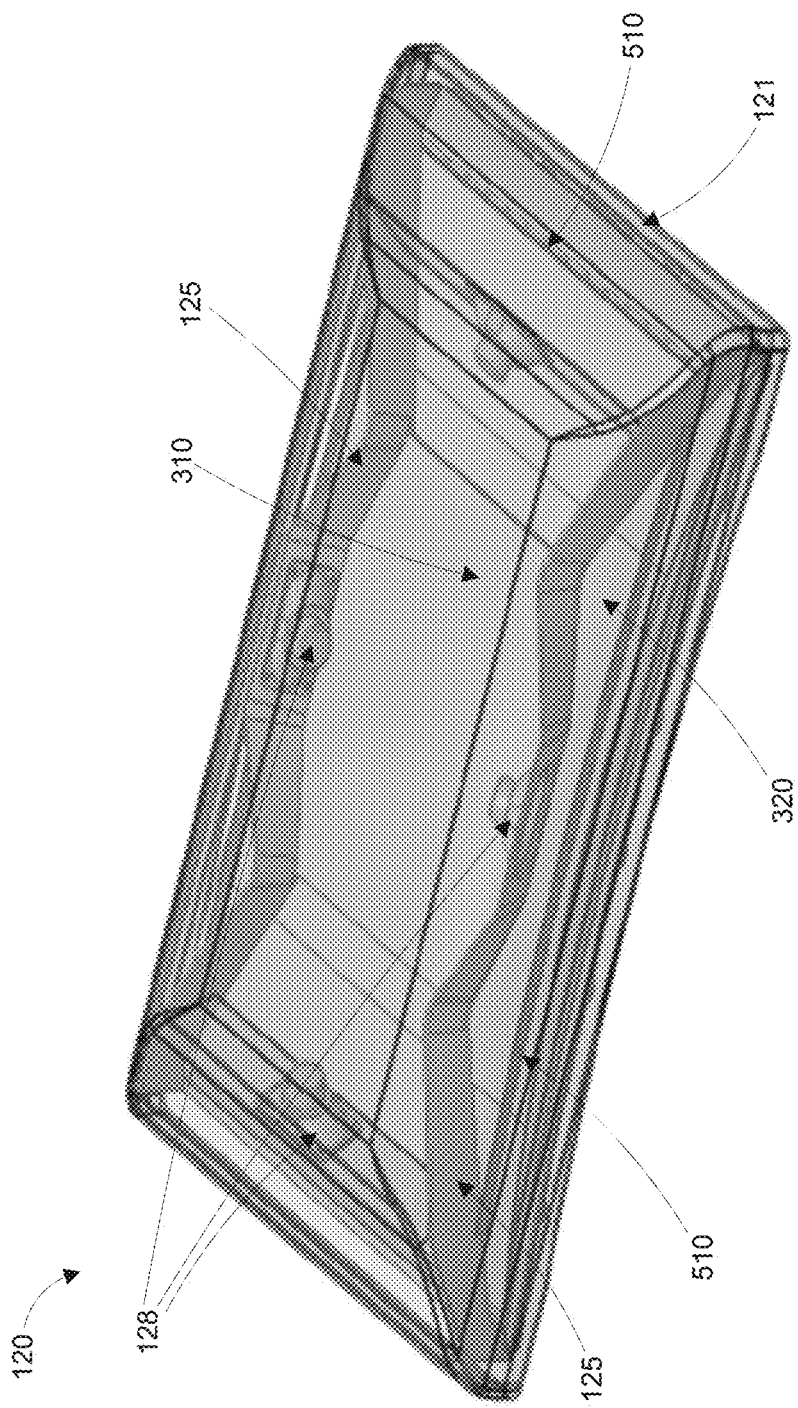
FIG. 5 is a perspective back view of an alternative display device according to some embodiments.
Figure 6:
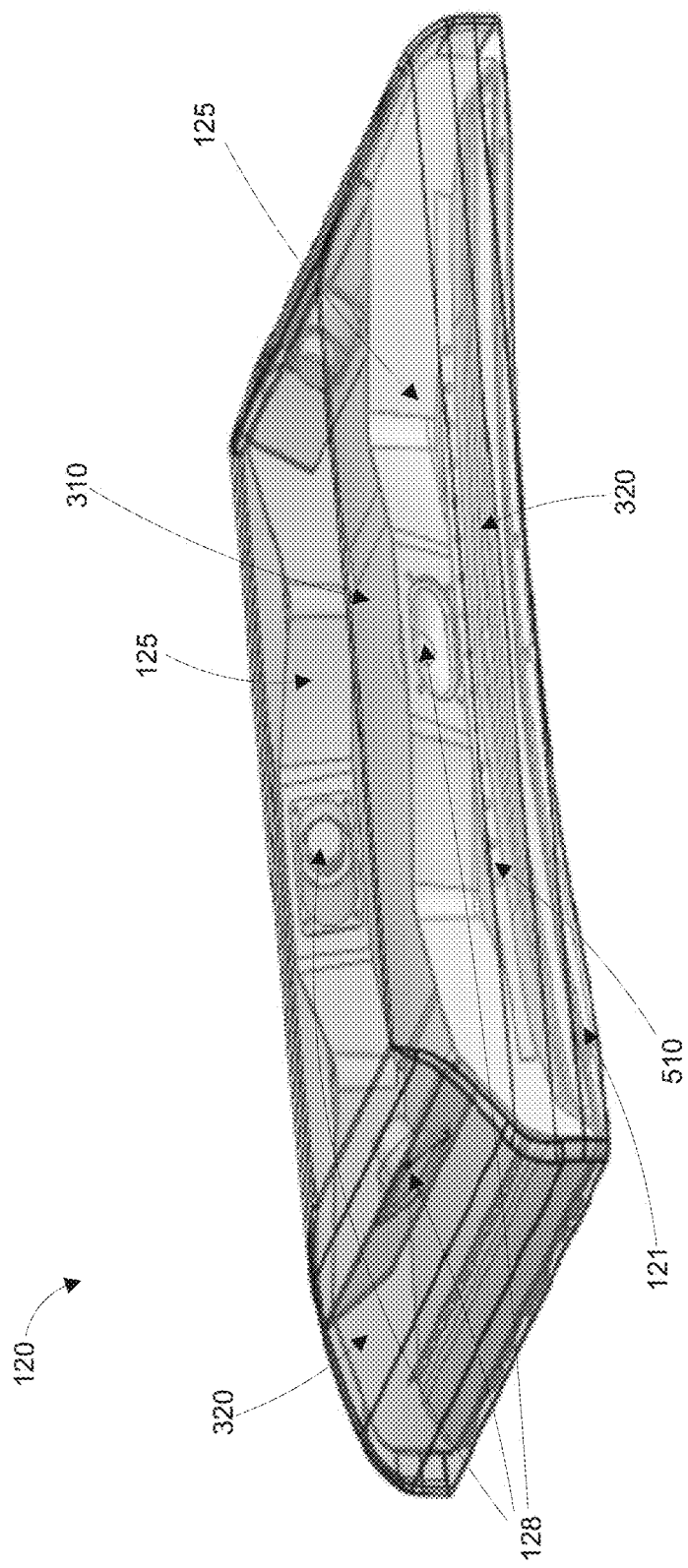
FIG. 6 is a perspective side view of the display device of FIG. 5.
Figure 7:
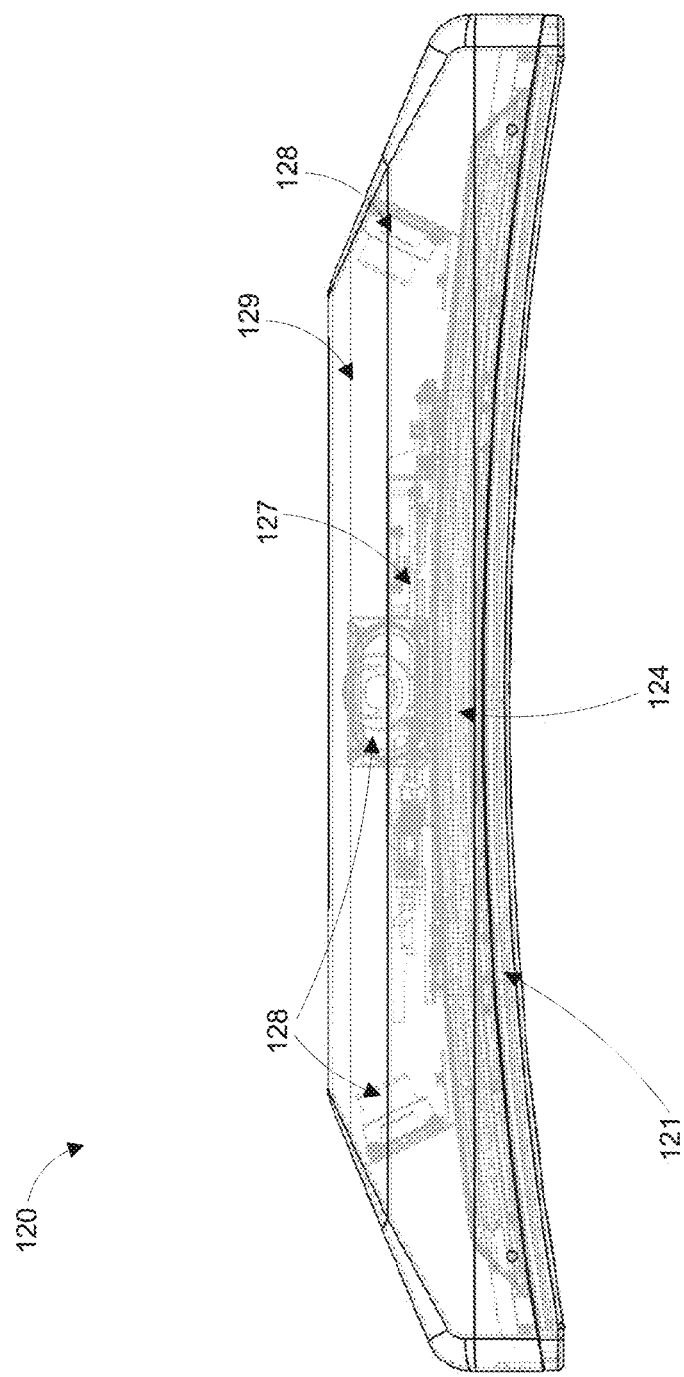
FIG. 7 is a top view of the display device of FIG. 1.
Figure 8:
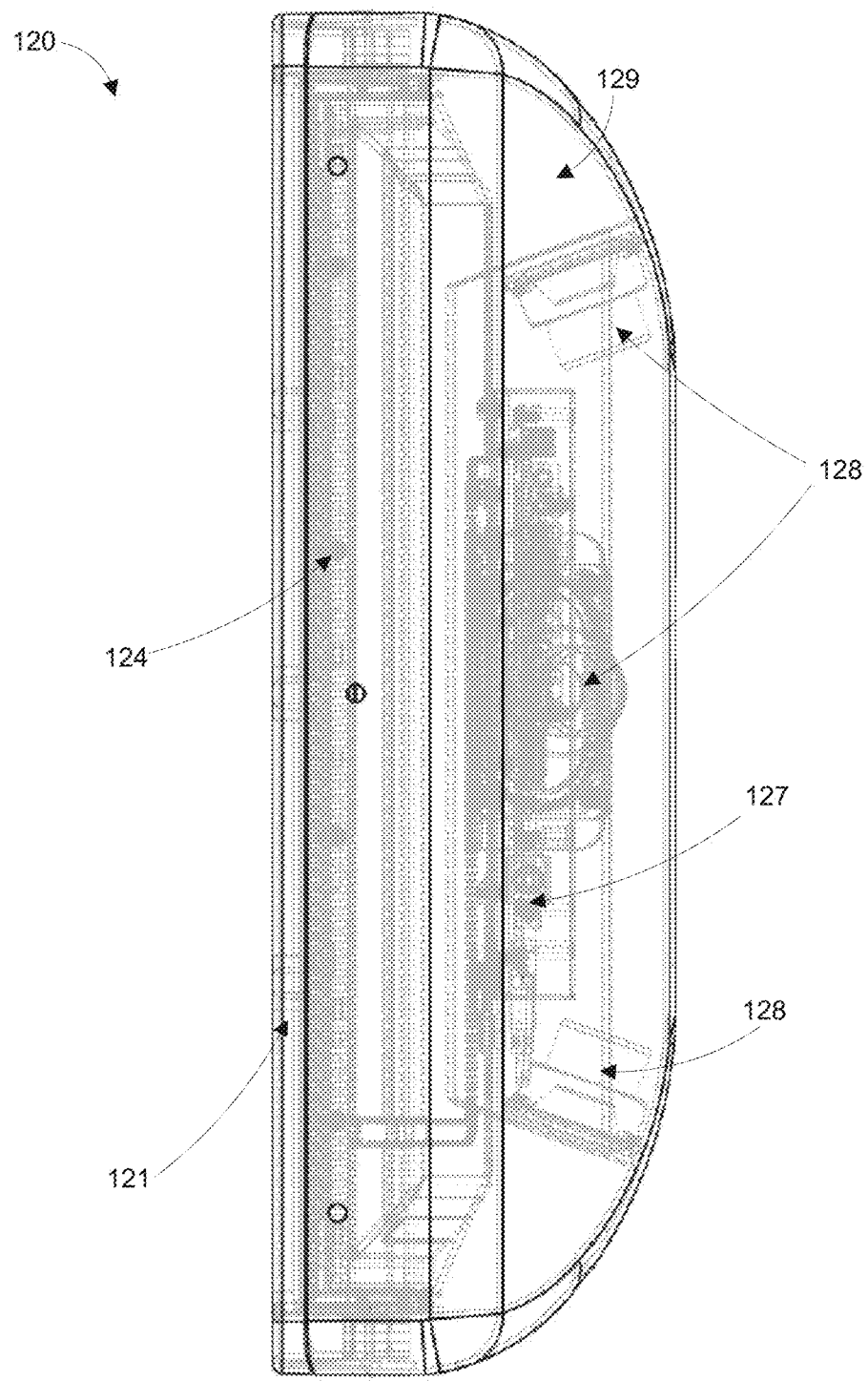
FIG. 8 is a side view of the display device of FIG. 1.

According to some embodiments, sound guide 125 is configured to act as a waveguide for the audio produced by speakers 128, and may be shaped and positioned to steer the sound produced by speakers 128 out through sound delivery apertures 123. According to some embodiments, sound guide 125 may extend between the back of display screen 124 and the inside of back panel 129 and is positioned and shaped to divide the internal space between display screen 124 and back panel 129 into at least one internal plenum 310 and at least one external plenum 320, as best illustrated in FIGS. 3, 5 and 6.

FIGS. 2 to 4 show one possible configuration and shape of sound guide 125, which divides the space into one internal plenum 310 and one external plenum 320. FIGS. 5 and 6 show an alternative embodiment, in which sound guide 125 instead defines one internal plenum 310 and four external plenums 320.

Sound guide 125 may comprise a single wall, which may be a continuous wall enclosing internal plenum 310, or a plurality of individual walls, which may intersect, join and/or abut one another in some embodiments. According to some embodiments, such as those illustrated in FIGS. 5 and 6, sound guide 125 may be curved in shape. According to some embodiments, sound guide 125 may be straight or substantially straight. According to some embodiments, sound guide 125 may be shaped to damped undesired vibrations of speakers 128. For example, as shown in FIGS. 5 and 6, sound guide 125 may be of a "W" shape having some elasticity and may be configured to flex to some degree in order to reduce vibrations produced by speakers 128 being transferred to the housing of primary display 120.

According to some embodiments, sound guide 125 may be sized and positioned a predetermined distance away from apertures 123 in order to create an enhanced quality for the audio waves travelling from speakers 128 through apertures 123. According to some embodiments, the predetermined distance may be around 75 mm for the top and bottom of sound guide 125, and around 120 for the sides of sound guide 125. This distance may be tuned depending on the size and shape of screen display 124, sound guide 125 and apertures 123, as well as the properties of speakers 128. According to some embodiments, apertures 123, sound guide 124 and speakers 128 are configured to guide the generated audio output from the speakers 128 toward a predetermined viewing zone in front of display screen 124. For example, the audio may be guided to a zone 0.25 m to 1 m away from the front of screen display 124, and toward the centre of screen display 124 (i.e. toward an expected location of the head of a viewer of display 124), which may be around 1 m to 1.5 m from a floor on which gaming machine 100 is positioned. According to some embodiments, the audio may be guided to a zone 0.35 m to 0.65 m away from the front of screen display 124, and to a position around 1.2 to 1.4 m from a floor on which gaming machine 100 is positioned. According to some embodiments, sound guide 125 may be trapezoidal in shape when viewed from the side, with the walls slanting outward toward the back of display 120.

According to some embodiments, sound guide 125 defines one or more speaker support apertures 126, configured to allow speakers 128 to sit within speaker support apertures 126 in order that audio delivered by speakers 128 is communicated to external plenum 320. According to some embodiments, each speaker 128 may have a respective speaker support aperture 126 in proximity to speaker 128. According to some embodiments, sound guide 125 may define one, two, three, four, five, six, seven, eight, nine, ten or more apertures 126. Speakers 128 may be arranged to face away from internal plenum 310, and may be positioned to generate audio in a direction parallel to screen display 124. According to some embodiments, speakers 124 may be arranged in a circular array around internal plenum 310.

External plenum 320 may be in fluid communication with sound delivery apertures 123, to allow for audio generated by speakers 128 to be delivered through external plenum 320 and sound delivery apertures 123 to a user viewing display screen 124. According to some embodiments, apertures 123 are not aligned with speakers 128, such that the sound generated by speakers 128 is caused to reflect internally within external plenum 320 before reaching apertures 123.

According to some embodiments, gaming machine 100 may be configured to produce a 100 dB sound pressure level (SPL) with an input pink noise signal at 0.5 meters from gaming machine 100. The frequency response may be in the range of 40 Hz to 20 KHz, and may be configured to have minimal phase delay at the crossover point. Two way speaker systems (such as woofer/tweeter and woofer/full range systems) have a variation in frequency response as the listening position moves off axis in both a vertical direction (caused by moving your head up and down, for example) and a horizontal direction (caused by moving your head side to side, for example). Having minimal phase delay at the crossover point reduces the effects of the off axis response variations caused by such movements of the listener.

Speakers 128 may be configured to produce 95 dB SPL with an input pink noise signal at 0.5 meters, while sub-woofer 150 may be configured to produce 100 dB SPL with an input pink noise signal at 0.5 meters. According to some embodiments, the total harmonic distortion (THD) of gaming machine 100 may be less than 0.5% at the specified rated output. The signal-to-noise ratio of gaming machine 100 may be around 80 dB or better at an input gain of 1 and 0 dBu input.

According to some embodiments, primary display 120 further comprises one or more lighting elements 510, best seen in FIGS. 5 and 6. Lighting elements 510 may be positioned along an outside edge of back panel 129, in external plenum 320. While the illustrated embodiment shows four lighting elements 510, according to some embodiments, primary display 120 may comprise one, two, three, five, six, seven, eight, nine, ten or more lighting elements 510. Lighting elements 510 may comprise LED lighting strips in some embodiments. According to some embodiments, lighting elements 510 are configured to direct light out of apertures 123, either directly or through reflection. According to some embodiments, the internal surfaces of front panel 121 and back panel 129 may be coated, textured or otherwise configured to reduce "hot spots" forming in the reflected light from lighting elements 510, to produce the effect of an even glow emitting from apertures 123.

Figure 9:
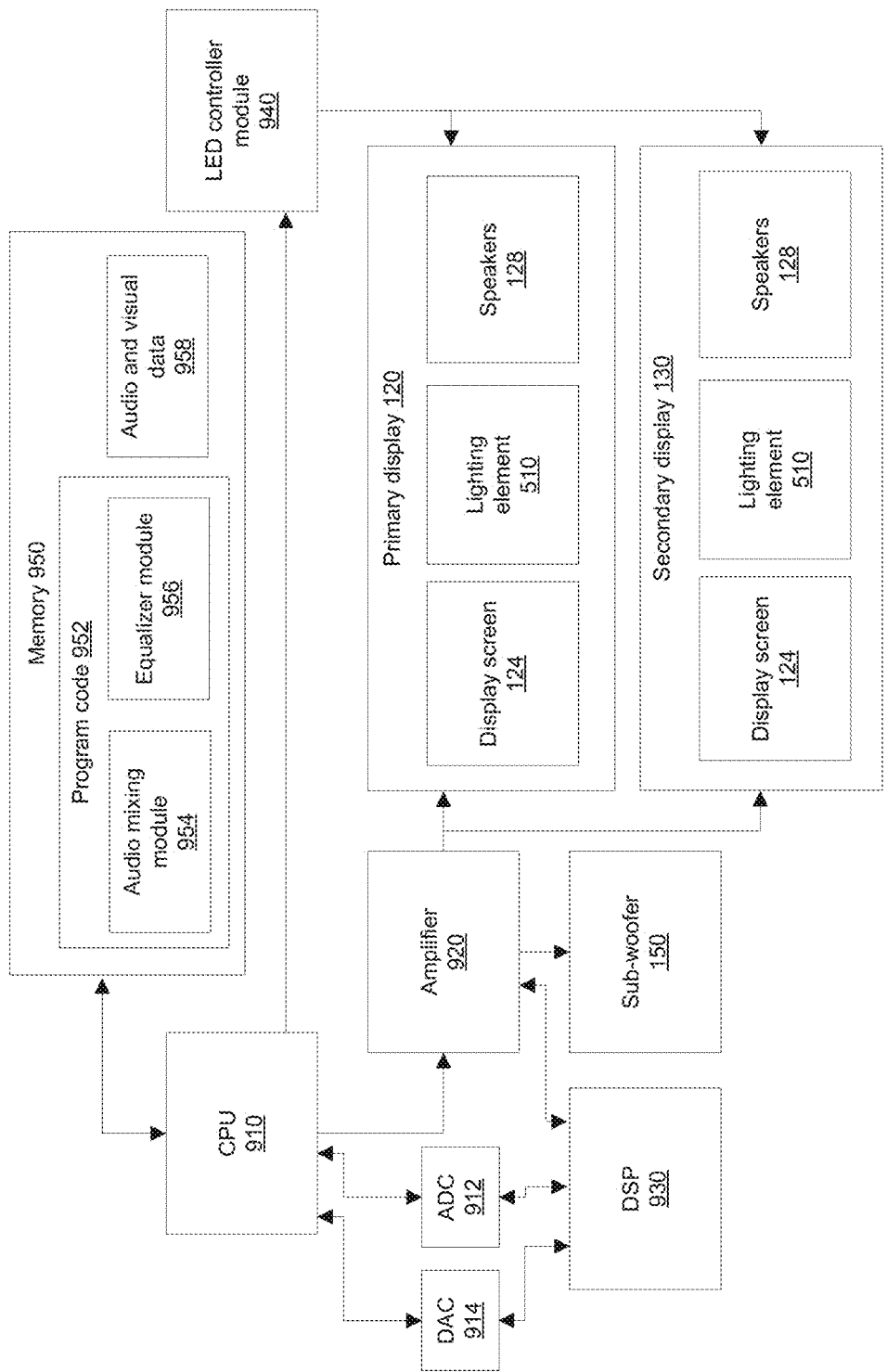
FIG. 9 is a schematic block diagram of the hardware components of the gaming machine of FIG. 1.

FIG. 9 shows a block diagram of the hardware components of some embodiments of gaming machine 100. Gaming machine 100 includes a CPU 910, analogue-to-digital converter (ADC) 912, digital-to-analogue converter (DAC) 914, an amplifier 920 in communication with a digital signal processor (DSP) 930 and sub-woofer 150, an LED controller module 940, memory 950, primary display 120, and a secondary display 130. Primary display 120 and secondary display 130 each include display screens 124, lighting elements 510 and speakers 128 as described above with reference to FIGS. 2 to 8. According to some embodiments, primary display 120 may include four speakers 128, and secondary display 130 may include two speakers 128. According to some embodiments, primary display 120 may include three speakers 128, and secondary display 130 may include three speakers 128.

CPU 910 may comprise one or more processors configured to execute code stored in memory 950. According to some embodiment, CPU 910 may comprise a microprocessor, which may be a Microchip PIC24fj256GB206 microprocessor according to some embodiments. According to some embodiments, CPU 910 is in communication with ADC 912, DAC 914, amplifier 920, LED controller module 940 and memory 950. CPU 910 is configured to execute code stored in memory 950 to present one or more games on gaming machine 100. CPU 910 is configured to send instructions to amplifier 920 and LED controller module 940 to cause audio and visual data to be processed and displayed on gaming machine 100 during the presentation of the one or more games.

According to some embodiments, amplifier 920 is configured to receive instructions and audio data from CPU 910, and to communicate with DSP 930 in order to process the received audio based on the instructions received. DSP 930 is configured to mix and equalise the raw audio data based on instructions sent from CPU 910 to amplifier 920. Amplifier 920 is configured to deliver the processed audio data received from DSP 930 to primary display 120, secondary display 130 and sub-woofer 150, to allow for the audio to be delivered to a user of gaming machine 100 through speakers 128 of primary display 120 and secondary display 130, and through sub-woofer 150.

According to some embodiments, amplifier 920 may comprise at least one 6-channel input, 6-channel output amplifier module. The 6-channel input may comprise 6 analogue ⅛" stereo inputs in some embodiments, having 24Vdc Molex Mini Fit Jr 6 circuit connectors, for example. The 6-channel output may comprise Molex Mini Fit Jr 6-channel 12 circuit connectors in some embodiments. The outputs may include at least one sub-woofer output, at least one speaker output, and at least one broadcast channel, which may be used to broadcast sound to an external device in some scenarios. For example, when a jackpot event or other winning event occurs, a celebratory audio clip may be broadcast via the at least one broadcast channel to at least one speaker external to gaming machine 100, such as an overhead speaker at the venue housing gaming machine 100. According to some embodiments, amplifier 920 may include one sub-woofer output, four speaker outputs, and a broadcast channel output. Amplifier 920 may have a total rated amplifier power of 200-watts per amplifier module, with 50-watts of power for the subwoofer channel, 25-watts of power for each of the four speaker outputs, and 50-watts of power for the broadcast channel. Amplifier 920 may be powered by a 24V switched-mode power supply (SMPS) with an 8 A current supply. According to some embodiments, amplifier 920 may be a 4 stereo Class D amplifiers, having 3 stereo channels and 1 paralleled subwoofer channel.

DSP 930 may be a multichannel DSP and may be an Analog Devices ADAU1450WBCPZ SigmaStudio Audio Digital Signal Processor according to some embodiments. DSP 930 may include crossovers, an equalizer, limiters, compressors, and other digital signal processing modules.

According to some embodiments, ADC 912 may be a 3 stereo ADC and DAC 914 may be a 4 Stereo DAC. Audio data may be sent by CPU 910 to ADC 912, to convert the raw audio data to multiple 48 KHZ 24 bits audio bit streams. ADC 912 may sent the converted audio bit streams to DSP 930 for equalization, compression and limiting, filtering and signal mixing. According to some embodiments, to improve system bass response, DSP 930 may use bass management with custom DSP crossovers to remove low frequencies from the audio bit stream, and send the low frequencies to sub-woofer 150.

CPU 910 may configure ADC 912 and DAC 914 based on configuration data stored in memory 950, and may further download firmware into DSP 930. The DSP firmware may be factory customized for different size displays 120, different speakers 128 and different speaker configurations, and may be stored in memory 950. CPU 910 parameters and other system parameters may be updatable via a USB port via a boot loader program embedded in the firmware, or via other means. CPU 910 may be further configured to update DSP parameters such as filters parameters in real time.

Memory 950 is in communication with CPU 910 and is configured to store data including program code 952 executable by CPU 910 to cause CPU 910 to operate gaming machine 100. According to some embodiments, program code 952 includes an audio mixing module 954 and an equalizer module 956. Audio mixing module 954 comprises instructions executable by CPU 910 to cause DSP 930 to process raw audio signals received from amplifier 920. Equalizer module 956 comprises instructions executable by CPU 910 to cause DSP 930 to equalise audio received from amplifier 920.

Figure 10:
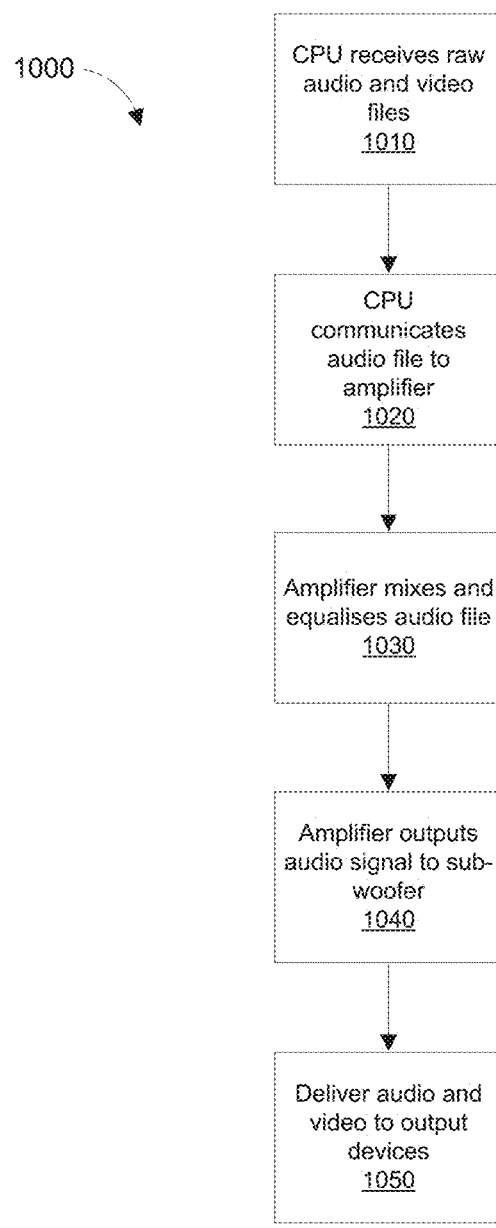
FIG. 10 is a flow diagram illustrating a method of operating the gaming machine of FIG. 1.

FIG. 10 shows a flowchart of a method of generating audio and visual content through gaming machine 100. According to some embodiments, CPU 910 is configured to retrieve raw audio and visual data 958 from memory 950 to be played through gaming machine 100 at step 1010. CPU 910 is configured to execute audio mixing module 954 and equaliser module 956, which causes CPU 910 to communicate audio and visual data 958 to amplifier 920 for processing at step 1020. At step 1030, amplifier 920 communicates audio and visual data 958 to DSP 930. According to some embodiments, DSP 930 is configured to mix and equalize audio and visual data 958. At step 1040, the analogue signals generated by DSP 930 are output by amplifier 920 to sub-woofer 150. At step 1050, which may be performed before, after, or at substantially the same time as step 1040, CPU 910 sends output signals to LED controller module 940 to control lighting elements 510, and DSP 930 outputs the mixed and equalised analogue signal to the primary and secondary displays 120 and 130 to be delivered by display screens 124 and speakers 128.

In some embodiments, lighting control signals used to control lighting elements 510 may be generated in real-time as the audio is processed. Alternatively, in some embodiments the lighting control signals may be pre-generated and stored with the raw audio and video files.

Figure 11:
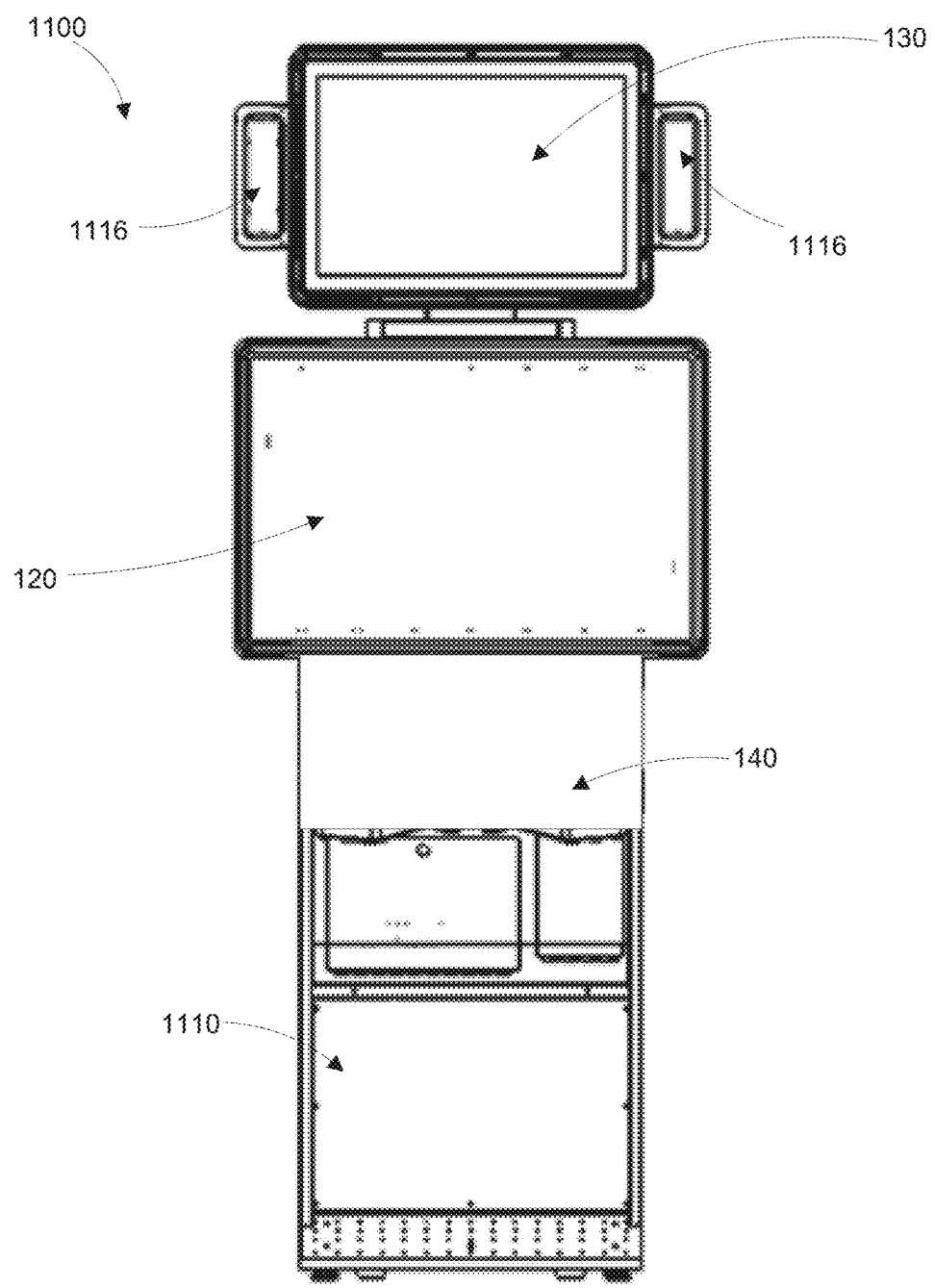
FIG. 11 is a front view of a gaming machine comprising an audio system according to some embodiments.
Figure 12:
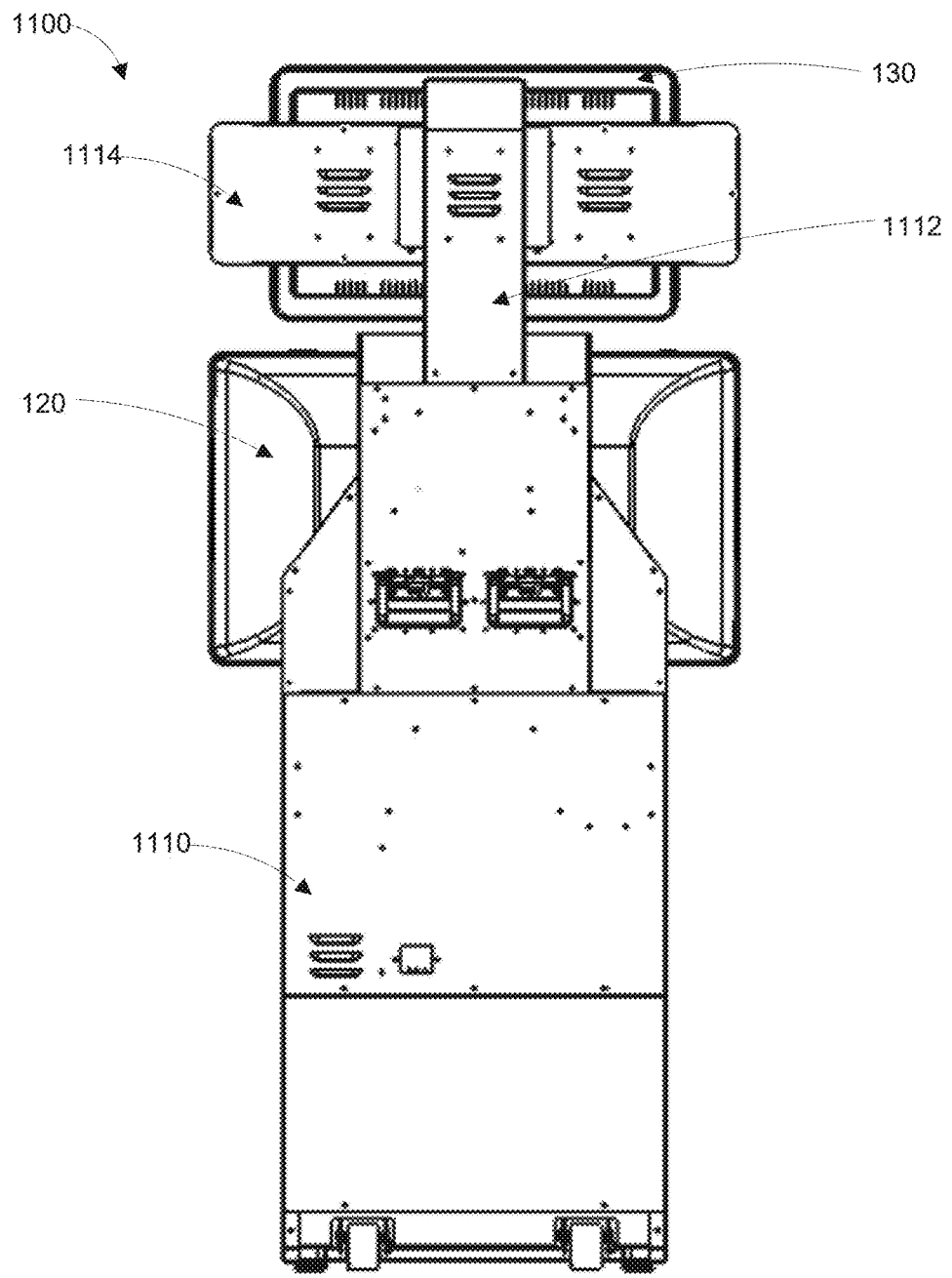
FIG. 12 is a back view of a gaming machine comprising an audio system according to some embodiments.

FIGS. 11 and 12 show front and back views, respectively, of a gaming machine 1100 according to some embodiments.

Gaming machine 1100 has a housing 1110, a primary display 120 and a secondary display 130, secondary display 130 being smaller than primary display 120. Housing 1110 is configured to hold primary display 120 on a support 1112. Support 1112 has a crossbar 1114 which holds secondary display 130. Housing 1110 further holds a user input panel 140 a sub-woofer 150 (not shown). Housing 1110 further supports speakers 1116, located to either side of secondary display 130.

Each of primary display 120 and secondary display 130 comprise an audio system as described above.

User input panel 140 may comprise one or more user input devices to allow a user to communicate with gaming machine 1100 and, according to some embodiments, play a game presented by gaming machine 1100. The input devices may include buttons, joysticks, keyboards, switches, touch screens, and other input devices. According to some embodiments, user input panel 140 may also comprise one or more output devices, such as a screen, printer, LEDs, or other output device, to communicate information to the user.

According to some embodiments, one or more operational parameters of speakers 128 and sub-woofer 150 may be predetermined using an iterative optimisation process, which may be configured to output optimised operational parameters for a particular speaker setup. The parameters may vary depending on the size and shape of primary display 120, and so may be run for each different primary display 120 being manufactured. The optimisation process may be executed on an external computing device (not shown) to gaming machine 100 in some embodiments. The external computing device may comprise at least a processor and a memory accessible to the processor, and the processor may be configured to execute code stored in the memory. The optimisation process may be an executable set of code, which may be stored in a memory device either within or external to the external computing device, and may be executable by the processor of the external computing device.

Figure 13:
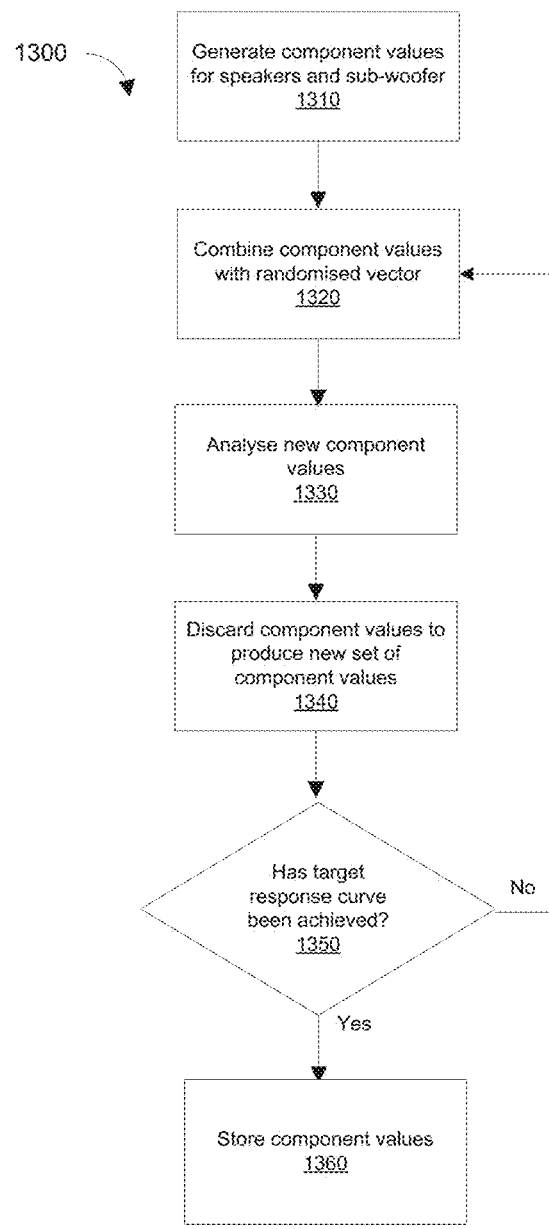
FIG. 13 is a flow diagram illustrating a method of optimising audio output for an audio system, such as for the gaming machine of FIG. 1.

According to some embodiments, the optimisation process may be based on a genetic mathematical algorithm, being a simplified mathematical model of the biological processes that organisms like bacteria use to mutate and evolve. The genetic algorithm may be applied to optimise electro-acoustical circuits. A flowchart illustrating the method of performing the optimisation process is shown in FIG. 13, and described in further detail below.

For example, speakers 128 and sub-woofer 150 may be considered to be the organism, and the speaker optimization parameters and crossover filters may be considered to be the DNA, with component values being considered to be the genes. The optimisation process may be given a target response curve, with the goal of the process being for the speakers 128 and sub-woofer 150 to produce a response corresponding to the target response curve, by modifying one or more component values of speakers 128 and sub-woofer 150.

A genetic algorithm may be configured to create a population of organisms with genes. Then parents are selected out of the gene pool and combined with a randomized vector to create children, via a mutation. The children that match the target better than their parents survive, while the ones that are inferior to their parents die. Thereby, a new population of organisms is created and the process repeats.

In the case of the audio system, once a gaming machine 100 or other display device has been designed and the physical locations of the speakers 128 and sub-woofer 150 relative to the housing 110 and the sound guide 125 have been determined, the optimisation program can be executed on the external computing device to determine a set of desired component values for the speakers 128 and sub-woofer 150, where the desired component values cause the audio system of gaming machine 100 to produce a particular predetermined output response. According to some embodiments, the predetermined output response may be selected to be pleasing to a human listener of the audio, to be within a particular frequency range, and/or to produce a particular audio effect.

Before the optimisation process is executed, a target response curve may be determined. The target response curve may correspond to the desired predetermined output response by the audio system of the gaming machine 100, to produce the desired audio experience for a user located in a target listening area of gaming machine 100, being a position that corresponds to the position of the head of a typical person (listener) interacting with primary display 120.

At step 1310 of method 1300, the external computing device executing the optimisation program may be configured to retrieve or generate a first set of one or more component values for the speakers 128 and sub-woofer 150. According to some embodiments, the first set of one or more component values may be retrieved from memory, where they may be stored as default component values. According to some embodiments, the first set of one or more component values may be retrieved from memory based on the last calculated values for a similar system. According to some embodiments, the values may be randomly generated.

The component values may relate to crossover frequency, amplifier gain values, capacitor values, resistor values, and filter values relating to speakers 128 and sub-woofer 150, for example. At step 1320, the external computing device executing the optimisation program may be configured to generate a randomized vector, and the first component values can be computationally combined with the randomized vector, for example by a vector multiplication process such as cross product or dot product, to create a second set of one or more component values.

According to some embodiments, step 1320 may produce multiple new component values for each initial component value. According to some embodiments, step 1320 produces only one new component value for each initial component value.

At step 1330, the new component values are analysed. The analysis may be done by configuring a gaming machine 100 with the second component values as determined by the external computing device at step 1320. The component values that cause the speakers 128 and sub-woofer 150 to produce a response closest to the predetermined target response curve may be kept, while the component values that produce a response further from the target response curve may be discarded. Where step 1320 has produced multiple new component values for each initial component value, the responses produced by the system programmed with each new set of component values may be compared with one another to determine which values should be kept and which should be discarded. If step 1320 has been used to produce only one new component value for each initial component value, the responses produced by the system programmed with the new component values may be compared with the responses produced by the system programmed with the initial component values. If the new values produce a response closer to the predetermined target response curve, then the new values are kept and the initial values are discarded, while if the new values produces a response further from the predetermined target response curve, then the initial values are kept and the new values are discarded.

Thereby, a third (kept) set of component values is created at step 1340 from the component values that cause the speakers 128 and sub-woofer 150 to produce a response closest to the predetermined target response curve.

At step 1350, the third set of component values is tested to ascertain whether the target response curve has been achieved. The analysis may be done by configuring a gaming machine 100 with the third set of component values determined by the external computing device at step 1350. If the response produced by gaming machine 100 configured with the third set of component values matches the predetermined target response curve, at step 1360 the third set of component values is stored to be used as the set of audio configuration settings for gaming machine 100 and optionally also other gaming machines having the same physical configuration.

The stored set of audio configuration settings may then be communicated to gaming machine 100 via a wired or wireless means to be stored in memory 950. The communication means may include Bluetooth, serial cable, USB, Wi-Fi, NFC, or other wired or wireless communication means.

If the response produced by gaming machine 100 configured with the third set of component values does not match the predetermined target response curve, the process repeats from step 1320, with the third set of component values becoming the first set of component values processed at step 130, until the target response curve has been achieved and the system is optimised.

Multiple parameters can be evaluated via this process, including, for example, the electrical signal that will be sent to each driver for each speaker 128 and sub-woofer 150, the on and off axis frequency response for each speaker 128 and sub-woofer 150 and how close the system performance will get to the design goal. The optimisation process can be run iteratively until the system is performing as desired.

Figure 14:
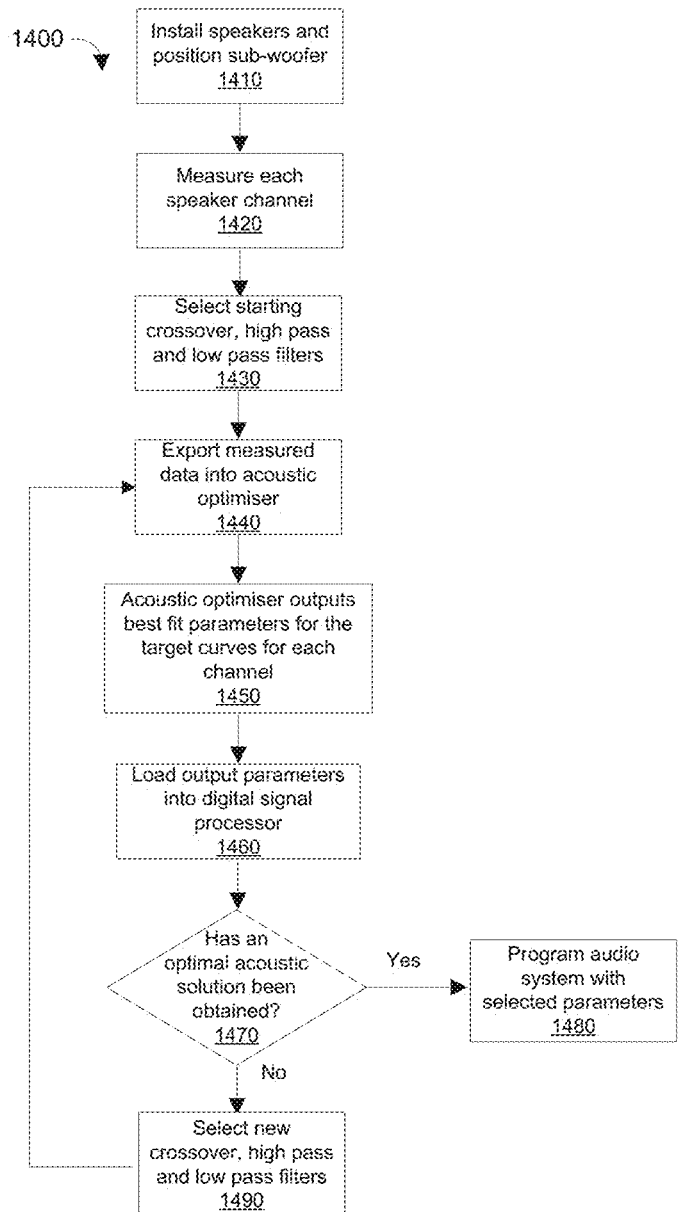
FIG. 14 is a flowchart of a method of configuring an audio system.

This process is described in further detail with reference to FIG. 14. FIG. 14 relates to a method 1400 of configuring a gaming machine 100 prior to use, in order to cause the audio system output to closely match one or more predetermined target response curves. According to some embodiments, each speaker 128 and sub-woofer 150 may have an individual and unique target response curve. According to some embodiments, one or more of speakers 128 and sub-woofer 150 may share the same target response curve.

At step 1410 of method 1400, the individual speakers 128 are installed into sound guide 125, and sub-woofer 150 is positioned in the housing 110. The positioning of speakers 128 relative to sound guide 125 may be predetermined to allow for audio emitted by speakers 128 to be directed by sound guide 125 to a position that corresponds to the position of the head of a typical person (listener) interacting with primary display 120. At step 1420, the output of each individual speaker 128 and sub-woofer 150 is measured. According to some embodiments, the output measurements may be taken using a Maximum Length Sequence System Analyser (MLSSA) measurement system. According to some embodiments, an alternative measurement system may be used, such as a Time Delay Spectrometry (TDS) measurement system or a fast-Fourier transform (FFT) based impulse response measurement system, for example. These output measurements are taken at the position in front of primary display 120 that corresponds to the position of the head of a typical person (listener) interacting with primary display 120. According to some embodiments, this may be around 0.35 m to 0.65 m away from the front of primary display 120, and to a position around 1.2 to 1.4 m from a floor on which gaming machine 100 is positioned.

At step 1430, initial component values are chosen for speakers 128 and sub-woofer 150. These values may relate to parameters of any high pass, low pass and crossover filters in the system, and/or to any other unknown parameters, such as values for the electrical signal that will be sent to each driver for each speaker 128 and sub-woofer 150, and the on and off axis frequency response for each speaker 128 and sub-woofer 150, for example. At step 1440, the output measurement data is loaded into an optimisation program, which may be the optimisation program described above with reference to FIG. 13, and the optimisation program may be executed according to method 1300 as outlined above with reference to FIG. 13. At step 1450, the optimisation program outputs the best fit parameters that cause the audio output of gaming machine 100 to most closely match the predetermined target response curves for each channel of speakers 128 and sub-woofer 150.

At step 1460, the output acoustic optimization data, including the best fit parameters determined at step 1450 and the predetermined target response curves, is loaded into DSP 930. At step 1470, DSP 930 compares the response of the system with predetermined target response curves to determine whether the response is within a predetermined range of the target response curves. If it is determined that the response is within the predetermined range, then at step 1480 speakers 128 and sub-woofer 150 are programmed with the best fit parameters determined at step 1450. Any other gaming machines 100 which are designed to the same specifications as the tested machine may also be programmed with the same parameters.

Alternatively, if DSP 930 determines that the response is not within the predetermined threshold of the target response curve, at step 1490 new component parameters are selected such as parameters relating to the crossover, high pass and low pass filters are selected for testing. Method 1400 then cycles back to step 1440, and iterates until the response falls within the required threshold.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. An audio system comprising:
at least one display device configured to display images;
at least two speakers configured to generate audio output;
housing structure configured to accommodate the at least one display device and the at least two speakers, the housing structure defining at least one sound delivery aperture that substantially surrounds a perimeter of the at least one display device;
a waveguide defined within the housing structure and configured to guide the audio output generated by the at least two speakers through the at least one sound delivery aperture; and
at least one lighting element in the housing structure, wherein the at least one lighting element is configured to direct light through the at least one sound delivery aperture;
wherein the at least two speakers are positioned in the housing structure to generate audio in a direction parallel to a screen of the at least one display device.

2. The audio system of claim 1, comprising at least four speakers.

3. The audio system of claim 1, wherein the speakers are installed in the waveguide.

4. The audio system of claim 1, wherein the waveguide divides the space inside the housing structure into at least one internal plenum and at least one external plenum.

5. The audio system of claim 1, wherein the speakers generate audio output in response to receiving digital signals from an amplifier.

6. The audio system of claim 5, wherein the amplifier is in communication with a digital signal processor (DSP) configured to mix and equalise the generated audio.

7. The audio system of claim 1, wherein the at least one lighting element is configured to direct light through the at least one sound delivery aperture by directing light onto an internal surface of the housing structure to reflect from the internal surface through the at least one sound delivery aperture.

8. The audio system of claim 1, wherein the at least two speakers are not visible from outside the housing structure.

9. The audio system of claim 1, wherein the at least one lighting element is not visible from outside the housing structure.

10. The audio system of claim 1, further comprising a second display device.

11. The audio system of claim 1, wherein the at least one display device is at least one of a television, a computer monitor, a gaming machine, a tablet, a mobile phone, and a handheld gaming device.

12. A gaming machine comprising at least one audio system of claim 1.

13. The gaming machine of claim 12, wherein the gaming machine comprises a sub-woofer.

14. A gaming machine comprising at least two audio systems of claim 1.

* * * * *